US012694286B2

(12) United States Patent
Le et al.

(10) Patent No.: US 12,694,286 B2
(45) Date of Patent: Jul. 28, 2026

(54) EXTRACTING EXPLANATIONS FROM ATTENTION-BASED MODELS

(71) Applicant: International Business Machines Corporation, Armonk, NY (US)

(72) Inventors: Thai F. Le, West Palm Beach, FL (US); Supriyo Chakraborty, White Plains, NY (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1205 days.

(21) Appl. No.: 17/549,090

(22) Filed: Dec. 13, 2021

(65) Prior Publication Data

US 2023/0186072 A1      Jun. 15, 2023

(51) Int. Cl.
    *G06N 3/08*     (2023.01)
    *G06N 5/02*     (2023.01)
(52) U.S. Cl.
    CPC ................. *G06N 3/08* (2013.01); *G06N 5/02* (2013.01)
(58) Field of Classification Search
    None
    See application file for complete search history.

(56) References Cited

U.S. PATENT DOCUMENTS

| | | |
|---|---|---|
| 10,909,401 B2 | 2/2021 | Burachas et al. |
| 11,055,616 B2 | 7/2021 | Dalli et al. |
| 2019/0108447 A1 | 4/2019 | Kounavis et al. |
| 2019/0156216 A1 | 5/2019 | Gupta et al. |

(Continued)

FOREIGN PATENT DOCUMENTS

| | | |
|---|---|---|
| CN | 113011192 A | 6/2021 |
| CN | 113761934 A | 12/2021 |

(Continued)

OTHER PUBLICATIONS

Shrikumar, A., Greenside, P. Kundaje, A.. (2017). Learning Important Features Through Propagating Activation Differences. <i>Proceedings of the 34th International Conference on Machine Learning</i>, in <i>Proceedings of Machine Learning Research</i> 70:3145-3153 Available from https://proceedin (Year: 2017).*

(Continued)

*Primary Examiner* — Omar F Fernandez Rivas
*Assistant Examiner* — Corey M Sackalosky
(74) *Attorney, Agent, or Firm* — Scully, Scott, Murphy & Presser, P.C.; Anthony M. Pallone

(57)     ABSTRACT

Providing an explanation for model outcome can include receiving input data, and passing the input data through an attention-based neural network, where the attention-based neural network learns attention weights associated with contextual embeddings corresponding to tokens of the input data and predicts an outcome corresponding to the input data. Based on an attention weight associated with a contextual embedding corresponding to a token of the input data, a signed relevance score can be determined to associate with the token for quantifying the token's relevance to the outcome. Based on the signed relevance score, an explanation of the token's contribution toward or against the outcome can be provided. The signed relevance score can be computed as a gradient of loss with respect to the attention weight.

19 Claims, 7 Drawing Sheets

(56) References Cited

U.S. PATENT DOCUMENTS

| | | | |
|---|---|---|---|
| 2019/0370647 A1 | 12/2019 | Doshi et al. |
| 2020/0167677 A1 | 5/2020 | Verma et al. |
| 2020/0193235 A1 | 6/2020 | Martinez-Canales et al. |
| 2020/0410355 A1 | 12/2020 | Zhu et al. |
| 2021/0232940 A1 | 7/2021 | Dalli et al. |

FOREIGN PATENT DOCUMENTS

| | | |
|---|---|---|
| TW | 201720118 A | 6/2017 |
| TW | I858384 B | 10/2024 |
| WO | 2023/110182 A1 | 6/2023 |

OTHER PUBLICATIONS

Sun, X., Yang, D., Li, X., Zhang, T., Meng, Y., Qiu, H., . . . Li, J. (2021). Interpreting Deep Learning Models in Natural Language Processing: A Review. arXiv [Cs.CL]. Retrieved from http://arxiv.org/abs/2110.10470 (Year: 2021).*

Serrano, Sofia, and Noah A. Smith. "Is Attention Interpretable?" Proceedings of the 57th Annual Meeting of the Association for Computational Linguistics, Association for Computational Linguistics, 2019. Crossref, https://doi.org/10.18653/v1/p19-1282. (Year: 2019).*

Giulia Vilone, Luca Longo, Notions of explainability and evaluation approaches for explainable artificial intelligence, Information Fusion, vol. 76, 2021, pp. 89-106, ISSN 1566-2535, https://doi.org/10.1016/j.inffus.2021.05.009. (https://www.sciencedirect.com/science/article/pii/S1566253521001093 (Year: 2021).*

Bach, S., Binder, A., Montavon, G., Klauschen, F., Müller, K. R., & Samek, W. (2015). On Pixel-Wise Explanations for Non-Linear Classifier Decisions by Layer-Wise Relevance Propagation. PloS one, 10(7), e0130140. https://doi.org/10.1371/journal.pone .0130140 (Year: 2015).*

David Baehrens, Timon Schroeter, Stefan Harmeling, Motoaki Kawanabe, Katja Hansen, and Klaus-Robert Müller. 2010. How to Explain Individual Classification Decisions. J. Mach. Learn. Res. 11 (Mar. 1, 2010), 1803-1831. (Year: 2010).*

Mcinnes et al., (2018). UMAP: Uniform Manifold Approximation and Projection. Journal of Open Source Software, 3(29), 861, https://doi.org/10.21105/joss.00861 (Year: 2018).*

Shrikumar, A., Greenside, P. & Kundaje, A.. (2017). Learning Important Features Through Propagating Activation Differences. <i>Proceedings of the 34th International Conference on Machine Learning</i>, in <i>Proceedings of Machine Learning Research</i> 70:3145-3153 Available from https://proceedin (Year: 2017).*

NIST, "NIST Cloud Computing Program", http://csrc.nist.gov/groups/SNS/cloud-computing/index.html, Created Dec. 1, 2016, Updated Oct. 6, 2017, 9 pages.

Ancona, M., et al., "Towards better understanding of gradient-based attribution methods for deep neural networks", arXiv: 1711.06104v2, Feb. 6, 2018, 16 pages.

Simonyan, K., et al., "Deep inside convolutional networks: Visualising image classification models and saliency maps", arXiv: 1312.6034v2, Apr. 19, 2014, 8 pages.

Selvaraju, R.R., et al., "Grad-cam: Why did you say that? visual explanations from deep networks via gradient-based localization", arXiv:1610.02391v1, Oct. 7, 2016, 17 pages.

Sundararajan, M., et al., "Axiomatic Attribution for Deep Networks", Proceedings of the 34th International Conference on Machine Learning, PMLR 70, 2017, arXiv:1703.01365v2, Jun. 13, 2017, 11 pages.

Bahdanau, D., et al., "Neural Machine Translation by Jointly Learning to Align and Translate", arXiv: 1409.0473v3, Oct. 7, 2014, 15 pages.

Luong, M.-T., et al., "Effective Approaches to Attention-based Neural Machine Translation", Proceedings of the 2015 Conference on Empirical Methods in Natural Language Processing, Sep. 17-21, 2015, pp. 1412-1421.

Ba, J.L., et al., "Multiple Object Recognition with Visual Attention", arXiv:1412.7755v2, Apr. 23, 2015, 10 pages.

Xu, K., et al., "Show, Attend and Tell: Neural Image Caption Generation with Visual Attention", arXiv:1502.03044v3, Apr. 9, 2016, 22 pages.

Liu, Y, et al., "Learning Structured Text Representations", Transactions of the Association for Computational Linguistics, Submission batch May 2017, Published Jan. 2018, pp. 63-75, vol. 6.

Mott, A., et al., "Towards interpretable reinforcement learning using attention augmented agents", arXiv: 1906.02500v1, Jun. 6, 2019, 16 pages.

Jain, S., et al., "Attention is not explanation", Conference of the North American Chapter of the Association for Computational Linguistics: Human Language Technologies 2019, Jun. 2-7, 2019, pp. 3543-3556.

Vashishth, S., et al., "Attention Interpretability Across NLP Tasks", arXiv:1909.11218v1, Sep. 24, 2019, 10 pages.

Wiegreffe, S., et al., "Attention is not not Explanation", Proceedings of the 2019 Conference on Empirical Methods in Natural Language Processing and the 9th International Joint Conference on Natural Language Processing, Nov. 3-7, 2019, pp. 11-20.

Serrano, S., et al., "Is attention interpretable?", Proceedings of the 57th Annual Meeting of the Association for Computational Linguistics, Jul. 28-Aug. 2, 2019, pp. 2931-2951.

Tensorflow, "Neural machine translation with attention", https://www.tensorflow.org/text/tutorials/hmt_with_attention, Last updated Dec. 4, 2021, Accessed on Dec. 13, 2021, 55 pages.

International Search Report dated Jan. 16, 2023 issued in PCT/EP2022/077547, 14 pages.

Serrano, S., et al., "Is Attention Interpretable?", arXiv:1906.03731v1, Jun. 9, 2019, 22 pages.

Vilone, G., et al., "Notions of explainability and evaluation approaches for explainable artificial intelligence", Information Fusion, May 25, 2021, pp. 89-106, vol. 76.

Taiwanese Notice of Allowance dated Aug. 30, 2024 received in Taiwan Application No. 111132421, 9 pages.

Mcinnes, et al., UMAP: Uniform Manifold Approximation and Projection for Dimension Reduction, arXiv: 1802.03426v3 [stat. ML], Sep. 18, 2020, 63 pages.

Shrikumar, et al. Not Just a Black Box: Learning Important Features Through Propagating Activation Differences, arXiv: 1605.01713v3 [cs.LG], Apr. 11, 2017, 6 pages.

* cited by examiner

Receive Input Data — 302

Pass Through Attention-Based Neural Network — 304

Determine Relevance Score Based on Attention Weights — 306

Provide Directional Explanation of Outcome — 308

EXTRACTING EXPLANATIONS FROM ATTENTION-BASED MODELS

STATEMENT REGARDING FEDERALLY SPONSORED RESEARCH OR DEVELOPMENT

This invention was made with Government support under W911NF-16-3-0001 awarded by the U.S. Army. The Government has certain rights to this invention.

BACKGROUND

The present application relates generally to computers and computer applications, and more particularly to machine learning, neural networks, and extracting meaningful explanations from attention-based models.

Different types of neural network architecture or deep learning architecture such as convolutional neural network, recurrent neural network, or other architectures can be implemented for performing different types of tasks as such machine translation, image captioning, and natural language processing. Attention-based neural network is another neural network architecture, which has been developed recently.

Attention-based neural network can be adopted in a wide range of tasks such as object recognition, image captioning, language modeling, and reinforcement learning. Attention mechanism provides the ability to dynamically focus on different parts of the input sequence when producing the predictions, and can improve performance.

Despite their success, neural networks often operate as "black-boxes" not providing any explanation behind their prediction outcome, which can raise questions as to whether a model has learned the correct concepts.

BRIEF SUMMARY

The summary of the disclosure is given to aid understanding of a computer system and method of extract explanations from attention-based models, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A method in an aspect, can include receiving input data. The method can also include passing the input data through an attention-based neural network, where the attention-based neural network learns attention weights associated with contextual embeddings corresponding to tokens of the input data and predicts an outcome corresponding to the input data. The method can also include, based on an attention weight associated with a contextual embedding corresponding to a token of the input data, determining a signed relevance score to associate with the token for quantifying the token's relevance to the outcome. The method can also include, based on the signed relevance score, providing an explanation of the token's contribution to the outcome.

In another aspect, the method can include receiving input data. The method can also include passing the input data through an attention-based neural network, where the attention-based neural network learns attention weights associated with contextual embeddings corresponding to tokens of the input data and predicts an outcome corresponding to the input data. The method can also include, based on an attention weight associated with a contextual embedding corresponding to a token of the input data, determining a signed relevance score to associate with the token for quantifying the token's relevance to the outcome. The method can also include, based on the signed relevance score, providing an explanation of the token's contribution to the outcome. Determining the signed relevance score can include computing a gradient of a loss with respect to the attention weight associated with the contextual embedding.

In yet another aspect, the method can include receiving input data. The method can also include passing the input data through an attention-based neural network, where the attention-based neural network learns attention weights associated with contextual embeddings corresponding to tokens of the input data and predicts an outcome corresponding to the input data. The method can also include, based on an attention weight associated with a contextual embedding corresponding to a token of the input data, determining a signed relevance score to associate with the token for quantifying the token's relevance to the outcome. The method can also include, based on the signed relevance score, providing an explanation of the token's contribution to the outcome. Determining the signed relevance score can include computing a gradient of a loss with respect to the attention weight associated with the contextual embedding, and multiplying the gradient with the attention weight.

In yet another aspect, the method can include receiving input data. The method can also include passing the input data through an attention-based neural network, where the attention-based neural network learns attention weights associated with contextual embeddings corresponding to tokens of the input data and predicts an outcome corresponding to the input data. The method can also include, based on an attention weight associated with a contextual embedding corresponding to a token of the input data, determining a signed relevance score to associate with the token for quantifying the token's relevance to the outcome. The method can also include, based on the signed relevance score, providing an explanation of the token's contribution to the outcome. The method can also include providing a test for accuracy of the explanation, the test testing for at least one of resiliency property and consistency property.

A system, in an aspect, can include a processor, and a memory device coupled with the processor. The processor can be configured to receive input data. The processor can also be configured to pass the input data through an attention-based neural network, where the attention-based neural network learns attention weights associated with contextual embeddings corresponding to tokens of the input data and predicts an outcome corresponding to the input data. The processor can also be configured to, based on an attention weight associated with a contextual embedding corresponding to a token of the input data, determine a signed relevance score to associate with the token for quantifying the token's relevance to the outcome. The processor can also be configured to, based on the signed relevance score, provide an explanation of the token's contribution toward or against the outcome.

A system, in another aspect, can include a processor, and a memory device coupled with the processor. The processor can be configured to receive input data. The processor can also be configured to pass the input data through an attention-based neural network, where the attention-based neural network learns attention weights associated with contextual embeddings corresponding to tokens of the input data and predicts an outcome corresponding to the input data. The processor can also be configured to, based on an attention weight associated with a contextual embedding correspond-ing to a token of the input data, determine a signed relevance score to associate with the token for quantifying the token's relevance to the outcome. The processor can also be con-figured to, based on the signed relevance score, provide an explanation of the token's contribution toward or against the outcome. The processor can be configured to determine the signed relevance score by computing a gradient of a loss with respect to the attention weight associated with the contextual embedding.

A system, in another aspect, can include a processor, and a memory device coupled with the processor. The processor can be configured to receive input data. The processor can also be configured to pass the input data through an atten-tion-based neural network, where the attention-based neural network learns attention weights associated with contextual embeddings corresponding to tokens of the input data and predicts an outcome corresponding to the input data. The processor can also be configured to, based on an attention weight associated with a contextual embedding correspond-ing to a token of the input data, determine a signed relevance score to associate with the token for quantifying the token's relevance to the outcome. The processor can also be con-figured to, based on the signed relevance score, provide an explanation of the token's contribution toward or against the outcome. The processor can be configured to determine the signed relevance score by computing a gradient of a loss with respect to the attention weight associated with the contextual embedding, and multiplying the gradient with the attention weight.

A system, in another aspect, can include a processor, and a memory device coupled with the processor. The processor can be configured to receive input data. The processor can also be configured to pass the input data through an atten-tion-based neural network, where the attention-based neural network learns attention weights associated with contextual embeddings corresponding to tokens of the input data and predicts an outcome corresponding to the input data. The processor can also be configured to, based on an attention weight associated with a contextual embedding correspond-ing to a token of the input data, determine a signed relevance score to associate with the token for quantifying the token's relevance to the outcome. The processor can also be con-figured to, based on the signed relevance score, provide an explanation of the token's contribution toward or against the outcome. The processor can also be configured to provide a test for accuracy of the explanation, the test testing for at least one of resiliency property and consistency property.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
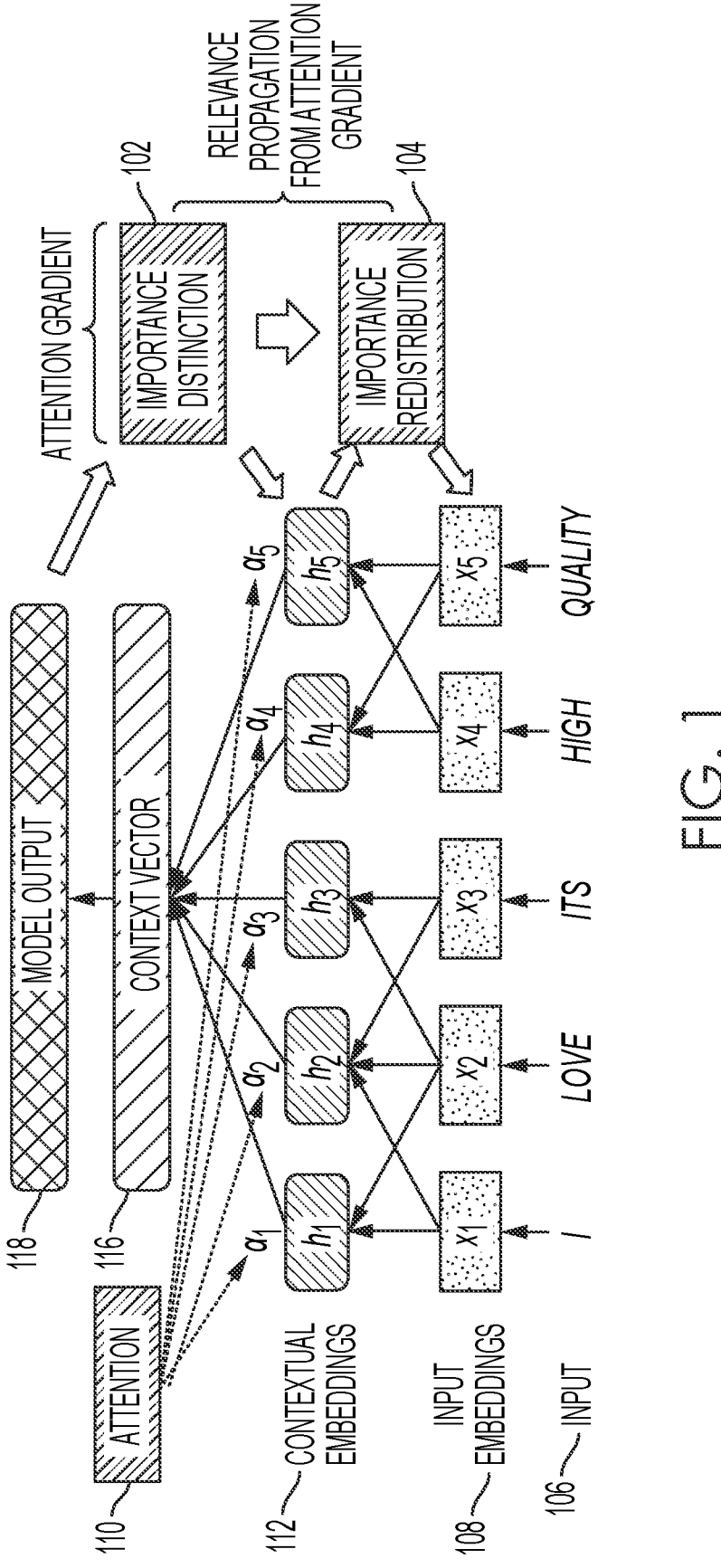
FIG. 1 is a diagram illustrating attention gradient in an embodiment.

In one or more embodiments, systems and methods can be provided, which can explain or interpret attention-based neural network, for example, provide an explanation or interpretability for the attention-based neural network's out-put. For instance, the systems and methods, can explain why, given an input sequence, the attention-based neural network made the prediction that it made. In further embodiments, systems and methods can be provided, which can evaluate the explanation performance using one or more properties that an effective explanation method should satisfy (e.g., faithfulness, resilience, and consistency). The systems and methods can also provide a corresponding test to quantify each property.

Briefly, attention-based neural network works with atten-tion weights. For instance, consider an attention-based neu-ral network implemented in the context of machine trans-lation, for example, translating a sequence of words from one language to another, such as translating a given input sentence in English into French. For example, given an input sentence in English, the attention-based neural network can be trained to output a translated sentence in French. By way of example, such attention-based neural network can have deep learning architecture such as long short term memory (LSTM) and/or recurrent neural network (RNN) architec-ture. For example, each word can be represented as a vector of certain dimension, e.g., 100 dimensions. The attention-based neural network learns attention weights of the words, for example, which token to focus on or to place most attention on, when generating an output token. The attention weights can be learned automatically by the deep model, for example, for generating each output token, to determine which token in the input to focus. Another example appli-cation of such attention-based neural network can be image captioning where input is the picture, and the output is the caption. For each word in the caption, the attention-based neural network can learn which portion of the picture to highlight or focus.

While attention weights can indicate which input tokens a focus or importance was placed on in making a prediction, attention weights alone do not explain how those input tokens contributed toward the output prediction, for example, whether positively or negatively. For instance, attention weights may not alone tell whether an input token contributed against the predicted class or towards the pre-dicted class. For example, attention weights may not be directly used as effective relevance indications because they do not contain the directional information for relevance.

In an embodiment, a new explanation technique can be provided, that produces directional relevance scores based on attention weights. In an embodiment, a system and/or method may take the gradient of the loss compared to the attention weights. Loss is computed based on the difference between the generated or predicted outcome or output and the target sequence (e.g., ground truth). One or more functions (e.g., cross entropy) can be used to compute the loss, and train neural networks. In an embodiment, a system, method, and/or technique disclosed herein can further exploit the loss, not only to train neural networks, but to generate explanations, and more specifically to understand how each contextual embedding (also called annotations) contributed to the model's output. Attention weights can reveal the importance of the annotations towards generating the prediction outcome. Annotation can be the encoder's contextual embedding of a token. In an embodiment, the gradient of the loss with respect to the attention weights, also called attention gradient, is used to make a distinction of whether a token contributed positively or negatively toward the prediction.

In an embodiment, a technique disclosed herein can utilize attention weights to help explain the decision process of neural networks such as transformers, which include as a component in their architecture, attention mechanism, the ability to dynamically adjust the weighting of the model among the input positions to produce the prediction.

In transformer-based classification models, contextual embeddings are computed for each word of the input sentence through stacks of self-attention layers. Then, attention weights are also learned and assigned to the contextual embeddings to generate the predictions. The attention weights can reflect the importance of the contextual embeddings towards the prediction outputs. However, attention weights without more may not always reflect a direct indication of which parts of the input are more relevant to the model's decision. For example, attention weights do not contain directional information in input relevance. For example, they do not distinguish between positive and negative contributions towards a prediction. For example, consider a sentiment classification task for the following sentence, "Though the price may be too expensive, I love its surprisingly high quality", which is correctly classified as positive (positive sentiment), with the contextual embeddings aligned with the words, "love", "expensive", "too", "high" and "surprisingly" having the largest attention weights. However, attention weights alone my not determine if these contextual embeddings contribute positively or negatively to the prediction. For example, intuitively, the words "too expensive" are more commonly associated with negative product reviews. In another aspect, attention weights may reflect the importance of—not the input words but—the contextual embeddings, and the contribution of contextual embedding h_i may not directly map to the contribution of the i-th input word. This is because each contextual embedding h_i contains information about the whole input sequence, including not only the i-th word, but also words surrounding it. To identify which words from the input sequence are more relevant to the model's decision, a technique may also map the contribution of the input words to the contextual embeddings.

FIG. 1 is a diagram illustrating attention gradient in an embodiment. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

Input (e.g., phrase) 106 can be transformed into input embeddings 108, e.g., n-dimensional vectors. By performing self-attention 110, contextual embeddings 112 can be generated. For example, an encoder learns to generate a context-aware intermediate representation for the input. For instance, self-attention incorporates the attention scores to each word's representation, e.g., relates each word to other words in the input sequence or phrase. Context vector 114 is generated based on the contextual embeddings. The model can generate its output 116 based on the context vector.

Attention gradient in an embodiment determines whether a contextual embedding contributes positively or negatively to a model's outputs, which is called importance distinction 102. For example, importance distinction includes computing the gradient of the loss (or the predicted class, if the label is not available) with respect to the attention weights. A negative gradient indicates that a contextual embedding contributes toward the decision's outcome as it decreases the loss. Similarly, a positive gradient indicates that a contextual embedding contributes against the decision's outcome as it increases the loss. For illustrating, reconsider the previous example sentence, "Though the price may be too expensive, I love its surprisingly high quality." Computing the gradient of the loss with respect to the attention weights reveals that although the contextual embeddings aligned with the words "too expensive" are important, they are in fact contributing against the positive sentiment outcome.

In another embodiment, relevance propagation from attention gradient builds on top of the attention gradient to compute the contribution of the input words to the different contextual embeddings. To compute the contribution of the input words to the different contextual embeddings, an importance redistribution component 104 may rely on a technique called layer-wise relevance propagation (LRP). More specifically, LRP back-propagates the relevance recursively from the contextual embedding layer to the input layer, and allows the system to determine the relevance between the input words and contextual embeddings.

Given an input sentence, and a trained neural network model with attention mechanism, e.g., a transformer model, a system and/or method disclosed herein can provide an explanation as to which words are most important for the model's decision toward or against the prediction outcome. In an embodiment, an attention-based explanation technique assigns a relevance score to each token of the input sentence quantifying its relevance to the model's outcome.

To formally describe the objective and the inner-workings of the technique, the following notations are introduced: Let the model input include a word sequence $x \in \mathbb{R}^{|x| \times d}$, where $|x|$ denotes the length of the sentence x, and d is the dimension of the word embeddings. Let a text classification model be functional mapping C: $\mathbb{R}^{|x| \times d} \to \mathbb{R}^O$, where O is the number of output classes. A word-level explanation method, E: $\mathbb{R}^{|x| \times d} \to \mathbb{R}^{|x|}$, computes a signed relevance score to each input word with the magnitude reflecting the relevance to the model output, and the sign capturing whether a word is contributing toward or against the model's decision.

In an embodiment, to compute the relevance scores, the technique decouples the relevance score computation into two components: importance distinction 102 and importance redistribution 104. In an embodiment, the attention gradient technique implements importance distinction. In an embodiment, the relevance propagation from attention gradient technique implements both importance distinction and importance redistribution.

Importance Distinction

In an embodiment, importance distinction component 102 addresses the question "Which contextual embeddings are more relevant to the model's decision?" To achieve it, the technique computes the gradient of the loss with respect to (w.r.t) the attention weights, i.e., $$\frac{\partial L}{\partial \alpha_i}$$

with L denoting the loss, and $\alpha_i (1 \le i \le |x|)$ the attention weights. This is because although the attention weight $\alpha_i$ reflects the importance of the contextual embedding $h_i$, they do not capture whether a contextual embedding contributes toward or against the model's decision. Instead, the gradient of the loss w.r.t. an attention weight can indicate whether that attention weight is decreasing or increasing the loss. In an embodiment, the technique may also compute the product $$\frac{\partial L}{\partial \alpha_i} \times \alpha_i.$$

The product can mitigate the gradient saturation problem. For each contextual embedding $h_i (1 \le i \le |x|)$, the gradient attention technique computes the relevance score as $$A_i = -\frac{\partial L}{\partial \alpha_i} \times \alpha_i. \tag{1}$$

In an aspect, Equation (1)'s negative sign considers that negative gradient values indicate the annotation reduces the loss, and therefore contributes positively to the outcome. In an embodiment, such computation can be performed after a model (e.g., a trained neural network model with attention mechanism, e.g., a transformer model) has been trained, and after an inference for a specific instance, for instance, when one would like to generate an explanation for that specific instance.

Importance Redistribution

The importance redistribution component 104 focuses on the question, "Given a contextual embedding, how much does each word contribute to it?" Formally, given a contextual embedding $h_i$, the technique may compute the relevance $R_{ij}$ of each input word $x_j$ to it.

A method to compute $R_{ij}$ can include back-propagating the token-level relevance by multiplying and averaging the stacked self-attention maps. This method is called attention rollout. However, attention rollout assumes a linear combination of the information across the attention heads at each layer. In reality, the Transformer architecture merges information from the attention heads in more complex ways (e.g., vector concatenation). As such, the technique disclosed herein may adopt the layer-wise relevance propagation (LRP). This general method allows one to measure the association degree between any two neurons in a neural network. It also back-propagates the relevance in a layer-wise manner, but operates at the fine-grained neuron level (and not token level). Consequently, LRP can capture the more complex interactions across the attention heads. To compute the contribution $R_{ij}$ from the input word $x_i$ to the contextual embedding $h_i$, the technique disclosed herein may sum the relevance of all neurons in the contextual embedding vector $h_i$, with each single neuron relevance being computed by back-propagation of the layer-wise neuron relevance. More specifically, in an embodiment, given a neuron v and its incoming neurons $u \in IN (v)$, the relevance that measures the contribution of u to v is calculated as $$r_{u \to v} = \frac{W_{u,v} u}{\sum_{u' \in IN(v)} W_{u',v} u'}, \tag{2}$$

where $W_{u,v}$ is the weight parameter in dense layers and the attention-weight in self-attention layers. Having computed the relevance $R_{ij}$, the relevance propagation from attention gradient technique then calculates the relevance score of each input word $x_j (1 \le j \le |x|)$ as:

$$R_j = \sum_{i=0}^{n-1} R_{ij} \times A_i. \tag{3}$$

The explanation performance of relevance propagation from attention gradient when using each of these techniques (LRP and rollout) for importance redistribution show that LRP is better suited than attention rollout, especially to capture the complex interactions across the attention heads.

For the attention gradient, the identify matrix, $R_{ij}=1$ for i=j, and $R_{ij}=0$, otherwise, can be used as the importance redistribution matrix. For example, attention gradient assumes the identity mapping, and associates contextual embedding $h_i$ exactly with the i-th word, $x_i$, from the input sentence. This scheme is referred to as identity redistribution.

Desirable properties of explanation methods can include faithfulness, resilience, and consistency. In various embodiments, corresponding tests to quantify those properties can be provided, which can be used systematically to evaluate the relevance scores generated by different explanation techniques.

Faithfulness

Faithfulness quantifies the fidelity of an explanation by measuring if the words identified by an explanation as important are indeed important to the model decision. Faithfulness can be used to evaluate the quality of generated explanations. For example, the positive contributions and negative contributions can be distinguished. In addition, distinction can be made between plausibility and faithfulness. While plausibility addresses the alignment between explanation and human intuition, faithfulness captures the alignment between explanation and the processing performed by the model to arrive at the decision.

Definition 1 (Faithfulness). An explanation provided by a feature attribution method is faithful if it reflects the actual information and its importance degree as used by the model to make the decision.

Test: In an aspect, the occlusion test can be used for positive and negative words, respectively. More specifically, the test may delete positive words (identified by the explanation as contributing to loss reduction) from correctly classified samples in decreasing order of their importance and measure the drop in model accuracy on the perturbed samples. A steep drop in accuracy indicates high faithfulness of positive words. Similarly, the test may delete negative words (identified by the explanation as contributing to loss increase), but the test may do so from misclassified samples and in increasing order of their importance, and measure the increase in model accuracy on the perturbed samples. A steep increase in model accuracy indicates faithfulness to negative words. For example, for each explanation technique, a faithfulness test may delete words from correctly classified test sentences in decreasing order of their explanative value, and measure the classification accuracy. As another example, for each explanation technique, a faithfulness test may delete words from correctly classified test sentences in increasing order of their explanative values and measure the classification accuracy.

In an aspect, performance of attention gradient in identifying words that are relevant to the model decision can also imply that the words can also be used to generate adversarial attacks. Adversarial attacks involve identifying minimal set of words which when replaced by their synonyms minimize the adversarial loss, resulting in targeted or untargeted misclassification. In an aspect, the attention gradient can be used to identify the relevant words and then replace them with their synonyms. This can result in reduced iterations to generate a targeted/untargeted attack from the original text.

Resilience

Explanation resilience or robustness measures the change in generated explanations due to changes in the input that cause minimal or no change to the model. For example, explanations should be stable against such minor perturbations, and not change much when the model output is invariant to the noise added to the input.

Definition 2 (Resilience). An explanation method is resilient if it provides "similar" explanations for different data samples with "similar" features but producing the same model output. Sample and explanation similarities are w.r.t the chosen metrics. Similarities can be measured based on a predetermined or configurable threshold.

In an aspect, some of the quantities (such as the local Lipschitz constant) may not be computed easily for complex language domains. In an embodiment, a system and/or method may use the following test for empirically measuring explanation resilience.

Test: In an embodiment, the system and/or method may consider correctly classified samples. For each such sample, the system and/or method may randomly select a varying number of target words, and replace them with their synonyms to produce perturbed samples. A replacement word is considered as a synonym if it has the highest cosine similarity with the target word. For example, given a word targeted to be replaced, the system and/or method may identify a number of candidate synonyms and select the one that has the highest cosine similarity value. If the predicted class does not change for a perturbed sample, the explanations (or importance ranking of words) for the original and the perturbed samples are compared for similarity using the weighted Kendall's T measure. Kendall's T measures the correlation between two ranked lists and its value depends on the number of pairwise disagreements in the two lists. Values close to one indicate strong agreement while values close to negative one indicate strong disagreement between the lists. Higher value indicates better resilience.

For instance, an explanation should be resilient (e.g., not change much) to data perturbations that do not affect the model output. In an embodiment, for all correctly classified test sentences, a resiliency test may choose words at random and replace each word with its topmost synonym. A resiliency test may then compare the explanations before and after the perturbations. In an embodiment, the similarity measure should reward explanations that preserve the ordering of the top words, and penalize those that alter the order. A resiliency test may sort the explanations in descending order of explanative values, and report the length of the common prefix. Experiment results show that attention gradient can preserve the relative ordering of the importance of words when the model decision is invariant to the added perturbations.

In an aspect, an explanation provided using the techniques described herein can be resilient to random perturbations, yet sensitive to adversarial changes. For example, a resiliency test can consider input tokens in increasing order of their gradient value, and attempt to replace them with synonyms. To ensure that the adversarial changes are subtle, a resiliency test may only replace a word if all the following conditions are satisfied: The cosine similarity is larger than a threshold (0.8); The two words have the same part-of-speech; Two words have different lexeme. By way of example, a resiliency test can allow a single word replacement per sentence. Experiment results show that attention gradient can be sensitive to adversarial changes.

Consistency

A well trained deep learning model is expected to learn latent space representations (i.e., contextual embeddings) that are close for data samples from the same class (intra-class cohesion) and further apart for samples belonging to different classes (inter-class separation).

Definition 3 (Consistency). An explanation method is consistent if for samples from the same class, their identified important words by the explanation have contextual embeddings that are "close" (e.g., based on a predefined or configurable threshold) w.r.t. a chosen metric; and for samples from different classes, their identified important words by the explanation have "distant" (e.g., based on a predefined or configurable threshold) contextual embeddings w.r.t the same chosen metric.

Test: For each correctly classified sample, the test may select the top-k words in their explanation, ordered in decreasing value of their importance. "k" can be configurable. For each sample, the test then take the mean of the k contextual embedding vectors (one for each selected word) and use it as a representative vector. These vectors (corresponding to the samples) are then clustered together and the quality of the cluster or their consistency is measured using the mean Silhouette score. The Silhouette score of a sample x is computed as $$s(x) = \frac{b(x) - a(x)}{\max(a(x),\, b(x))},$$

where a(x) is the average distance between x and other samples within the same class, and b(x) is the smallest mean distance of x to all points in any other class. The best case value of one indicates appropriate clustering and high consistency, and the worst case value of negative one indicates mismatched clusters or low consistency. Values close to zero indicate overlapping clusters.

In an aspect, a well trained deep learning model can learn latent space representations that are close for data samples from the same class (intra-class cohesion) and further apart for samples belonging to different classes (inter-class separation). In an embodiment, a consistency test may focus on the annotation vectors corresponding to the top words identified by each explanation method. A consistency test may reduce annotation vectors of the top words into a single vector by taking their average. A consistency test may use the silhouette score to measure the consistency within, and between, the clusters formed by the annotation vectors. Experiment results show that Clusters corresponding to attention gradient are well-formed.

In an embodiment, by way of example, the neural network model, such as one shown in FIG. 1, can be implemented a transformer model for text classification, for example, solving a translation problem. Specifically, for example, a class is predicted at the decoder part, where a special token <start> is used as decoder input. The first decoder hidden state is fed into a dense layer for classification. In one or more embodiments, one word, multiple correlated words, or sentences can be considered and provided as explanations.

In an embodiment, by way of example, Adam optimizer with $\beta_1=0.9$, $\beta_2=0.98$ and $\epsilon=10^{-9}$ can be used to train an attention-based neural network model. For example, the learning rate can be varied with respect to the training steps according to the following formula:

$$l = d_{model}^{-0.5} \cdot \min\left(s^{-0.5}, s \cdot s_{warmup}^{-1.5}\right),$$

where $d_{model}$ is the model hidden dimension, s denotes the training steps and $s_{warmup}$ denotes the pred-defined warmup steps. Generally, the learning rate first increases linearly in first $s_{warmup}$ steps, and then decreases proportionally to the inverse square root of the training steps. The warmup steps can vary among datasets.

In an embodiment, by way of example, the model hyper-parameters can be tuned to optimize the achieved model classification accuracy. For example, the model hyper-parameters such as embedding dimension, maximum words, vocabulary size, encoder layers, hidden size, filter size, residual dropout, heads number, warmup steps, training steps, and L2 regularizer, can be configured and/or tuned. The hyper-parameter tuning can be done independent of the model explanation procedure.

In an aspect, the attention gradient technique disclosed herein computes the attention gradient score for each contextual embedding as described in Equation 1. In an embodiment, it assumes an identify mapping between the contextual embeddings and input tokens.

In an aspect, the relevance propagation from attention gradient technique allocates the computed relevance scores for contextual embeddings by the attention gradient technique to the input tokens, according to the input token to contextual embedding contribution distribution calculated by LRP, as described in Equation 3.

Another example model, on which the explanation techniques described herein (e.g., attention gradient and relevance propagation from attention gradient) can be applied, can include a Bidirectional Encoder Representations from Transformers (BERT) model. For example, attention gradient can be used to explain the predictions of pre-trained BERT model. By way of example, such pre-trained model can be BERT-Base implementation with 12 Transformer blocks, which is fine-tuned with a learning rate of 5e-5, on each dataset for 3 epochs.

In one or more embodiments, the different explanation techniques with respect to desirable properties of explainability, for example, faithfulness, resiliency, and consistency can be provided.

Faithfulness test evaluates whether removing the identified most positively (respectively, negatively) contributing words from the correctly (respectively, incorrectly) classified samples can lead to significant accuracy changes. Steeper accuracy changes indicate more faithful explanations. The test in an embodiment may remove different number of words to observe the trend of accuracy changes. For example, the test may use the modified occlusion test for both positive and negative words. Random word deletion based perturbation can be used as the uninformed baseline. The results show that the attention gradient based methods disclosed herein can outperform other methods in identifying words that contribute towards (respectively against) the model's decision. For example, the results show that after removing the negatively contributing tokens in incorrectly classified samples, the accuracy increases. This is because removing such negative words increases the probability of the correct classes. These results demonstrate that the importance distinction can distinguish positive from negative contributions.

Resilience test evaluates whether the relevance score rankings among input positions are robust against subtle local changes in input data that does not affect model decisions. Experiment results show that the attention gradient based methods disclosed herein can outperform other methods. In an aspect, in this test, contextual embeddings may be less susceptible to small changes in the input as they include contributions from unperturbed words. Gradients may be sensitive to localized input perturbations. LRP may be sensitive to the changes in neuron activations due to the input perturbations.

Consistency test evaluates whether the contextual embeddings of the most important words identified for each sample are close to each other within the same class, and are distant to samples belonging to different classes. Consistent explanation methods should show better clustering structures among data samples represented by the identified important words. Experiment results show that the attention gradient based methods disclosed herein can outperform other methods, for example, in terms of their Silhouette scores. This indicates that the explanations generated by these techniques indeed identify positive words that are more representative of the class separation in the latent space spanned by the contextual embeddings.

In addition, the clusters can be visualized, e.g., using the t-SNE algorithm. For example, an experiment test can choose k=5 words from each explanation for the clusters. For each sample, the test can take the mean of the top-k contextual embedding vectors (with the largest positive relevance scores) and use it as the sequence representation. These vectors (corresponding to the samples) are then clustered together. The visualizations results show that the attention gradient based techniques disclosed herein can result in higher-quality clusters.

In an embodiment, to cluster words, their word embeddings can be chosen. In another embodiment, to cluster words, their contextual embeddings can be chosen. For instance, in an instance, the word embeddings may reflect the way a model operates on the words for a particular decision. In another instance, contextual embeddings can indicate the representational mapping that is actually used by the model. In an embodiment, contextual embeddings can be used to measure consistency.

Figure 2:
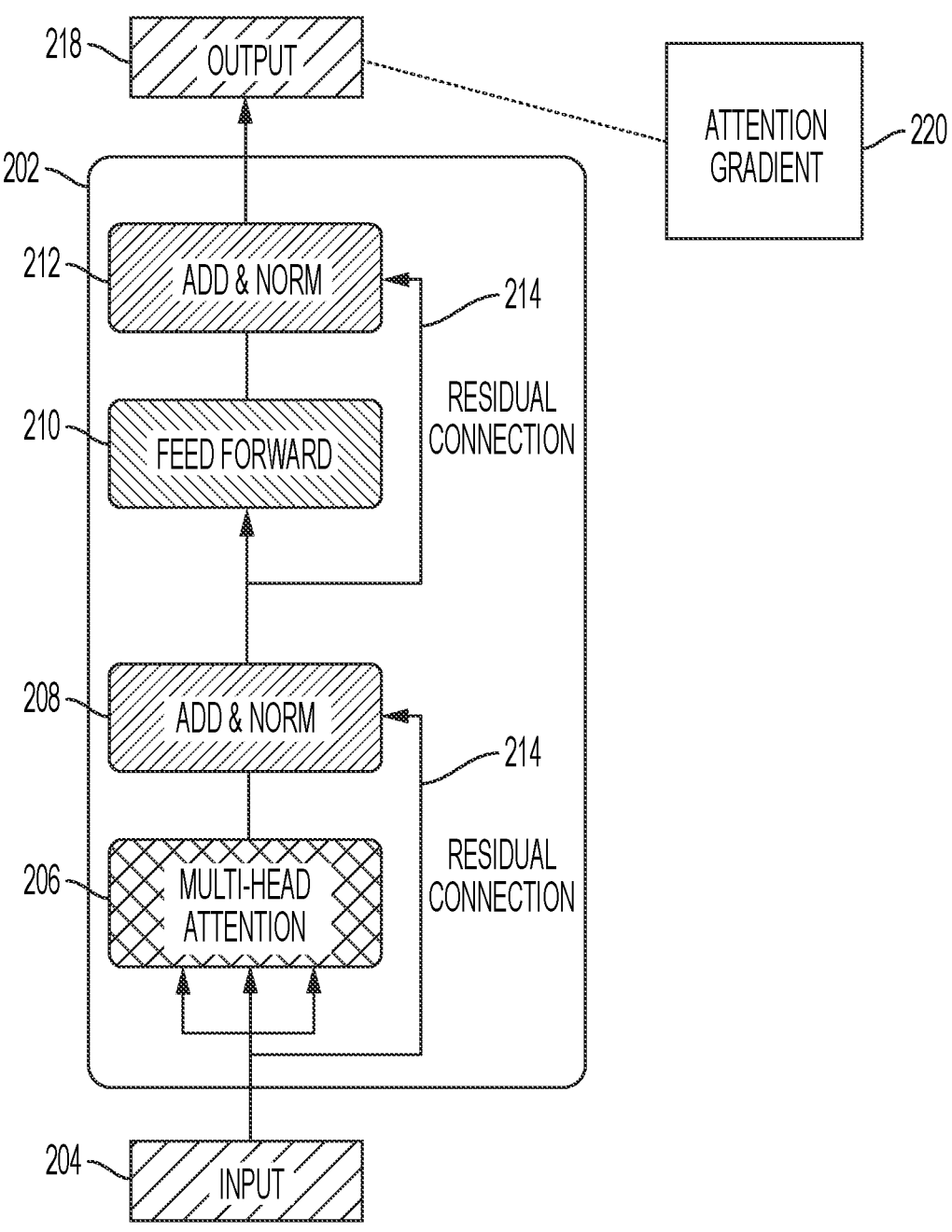
FIG. 2 shows an example transformer encoder block in an embodiment.

FIG. 2 shows an example transformer encoder block in an embodiment. Input 204 can be received into encoder 202. A multi-head attention block 206 can be used to perform self-attention over each input sequence 204. For example, for each phrase that is fed to the model, the multi-head attention block 204 may determine on a per-token (or per-word) basis which other tokens (or words) from the phrase are relevant to that token, for example, generate attention of where to attend to when reading that token or word. A feed-forward block 210 generates a vector of given dimension (e.g., n-dimensional vector) that encodes the token or word. A residual connection 214 flows from the input 204 to the first add and norm block 208. A residual connection 216 flows from the first add and norm block 208 to the second add and norm block 212. In add and norm block 208, the output from the multi-head attention block 206 is merged with the residual (e.g., by addition), the result of which can be normalized. In add and norm block 212, the output from the feed-forward block 210 is merged with the residual (e.g., by addition), the result of which can be normalized. The encoder 202 learns to generate a context-aware intermediate representation for the input tokens (the encoding), e.g., output at 218. Attention gradient 220 (e.g., as shown in Equation (1)) can be computed in part based on the context-aware intermediate representation 218.

While in some instances, the contribution of contextual embedding h_i may not directly map to the contribution of the i-th input word, it is observed that contextual embedding h_i actually contain information primarily from the i-th word from the input sentence. Further, the residual connections in the self-attention blocks of the Transformer architecture can reinforce the identity mapping between the contextualized embedding after the encoder and the input embeddings at the input layer. For example, in neural network or transformer architectures without the residual connections, e.g., where the correspondence between contextualized embeddings and input embeddings shifts considerably from the identity mapping, the relevance propagation from attention gradient technique disclosed herein can further improve the explanation performance.

A new explanation technique in an embodiment can use attention gradient, e.g., gradient of the loss w.r.t the attention weights. Tests to evaluate the accuracy of explanation can be provided, e.g., considering the following properties: Faithfulness to the model; Resilience to model-invariant perturbations; Sensitivity to adversarial noise; and Consistency.

Figure 3:
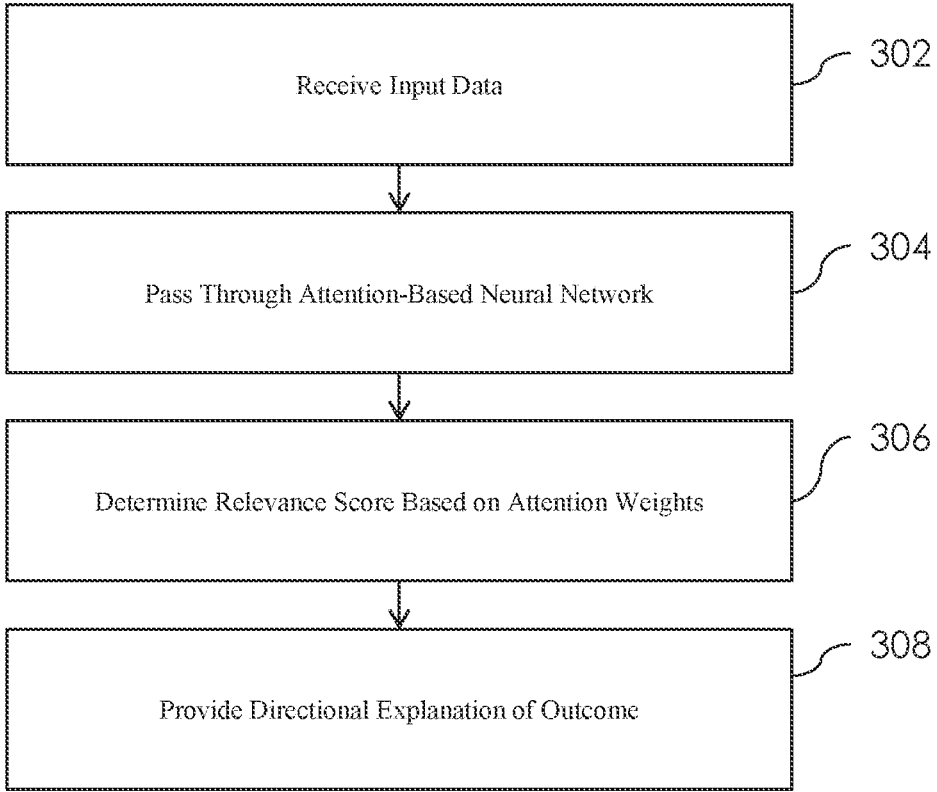
FIG. 3 is a flow diagram illustrating a method of provid-ing explanation for neural network prediction outcome in an embodiment.

FIG. 3 is a flow diagram illustrating a method of providing explanation for neural network prediction outcome in an embodiment. The method can be implemented or run on one or more computer processors, for example, including one or more hardware processors, which may be coupled with one or more memory devices. At 302, input data is received. Examples of input data can include, but not limited to, a sequence of text such as a sentence or phrase, an image such as a picture or video. For example, attention-based neural network can be trained to translate the input text data to another language, or to perform another natural language processing type of task. As another example, the attention-based neural network can be trained to generate captions associated with the input image data.

At 304, the input data is passed through an attention-based neural network. For example, the input data can include a sequence of tokens. For instance, in the case of a sentence, the input data can include a sequence of words. The tokens can be transformed into vectors or contextual embeddings. For example, the attention-based neural network may transform the tokens into contextual embeddings. The attention-based neural network learns attention weights associated with contextual embeddings corresponding to tokens of the input data and predicts an outcome corresponding to the input data.

At 306, based on an attention weight associated with a contextual embedding corresponding to a token of the input data, a relevance score, e.g., a signed relevance score, can be determined to associate with the token for quantifying the token's relevance to the outcome.

At 308, based on the relevance score, e.g., the signed relevance score, an explanation can be provided, for example, of the token's contribution, e.g., whether the token contributed toward or against the attention-based neural network's outcome or prediction. For example, in an embodiment, for a trained attention-based neural network model, given a test sample, the method can perform a forward pass through the network and compute the loss value. The method can then compute the gradient of the loss with respect to the attention weights. In an embodiment, this can be computed by backpropagating the gradient of the loss over the layers of the network. In an embodiment, the i-th dimension of the gradient vector, thus obtained, may be used for the explanative value of the i-th component of the input (and/or, e.g., annotation/embedding of the input), e.g., quantifying the positive or negative impact of the corresponding component towards the model output.

In an embodiment, the relevance score can be determined by computing a gradient of a loss with respect to the attention weight associated with the contextual embedding. In an embodiment, the relevance score can be determined by computing a gradient of a loss with respect to the attention weight associated with the contextual embedding, and multiplying the gradient with the attention weight. In an embodiment, the relevance score can be allocated to the token.

In an embodiment, a test can be provided for determining the accuracy of the provided explanation. In an embodiment, the test can test for resiliency. For example, in an embodiment, a subset of tokens in the input data can be selected for replacing, and another explanation can be provided with respect to the input data having the replaced tokens. Based on the explanation performance resulting from the test, the subset of tokens can be used in an adversarial attack experiment of the attention-based neural network. In another embodiment, the test can test for consistency.

Figure 4:
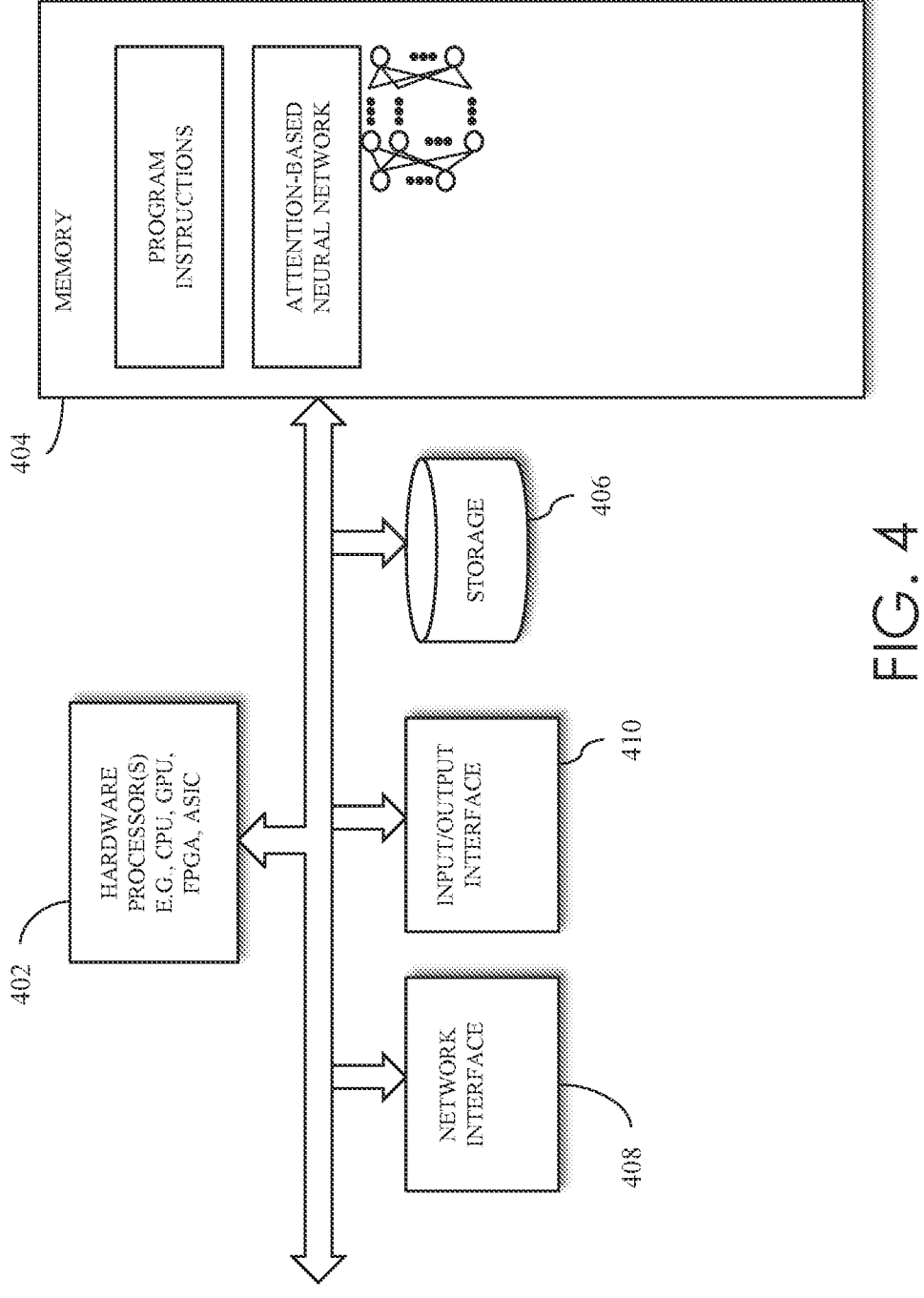
FIG. 4 is a diagram showing components of a system in one embodiment that can provide explanation for neural network prediction outcome.

FIG. 4 is a diagram showing components of a system in one embodiment that can provide explanation for neural network prediction outcome. One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and provide or extract explanation for prediction outcome. A memory device 404 may include random access memory (RAM), read-only memory (ROM) or another memory device, and may store data and/or processor instructions for implementing various functionalities associated with the methods and/or systems described herein. One or more processors 402 may execute computer instructions stored in memory 404 or received from another computer device or medium. A memory device 404 may, for example, store instructions and/or data for functioning of one or more hardware processors 402, and may include an operating system and other program of instructions and/or data. One or more hardware processors 402 may receive input data. In one aspect, such input data may be stored in a storage device 406 or received via a network interface 408 from a remote device, and may be temporarily loaded into a memory device 404 for processing. For example, one or more hardware processors 402 may pass the input data through an attention-based neural network, where the attention-based neural network learns attention weights associated with contextual embeddings corresponding to tokens of the input data and predicts an outcome corresponding to the input data. Based on an attention weight associated with a contextual embedding corresponding to a token of the input data, one or more hardware processors 402 may determine a signed relevance score to associate with the token for quantifying the token's relevance to the outcome. One or more hardware processors 402 may, based on the signed relevance score, provide an explanation of the token's contribution toward or against the outcome One or more hardware processors 402 may be coupled with interface devices such as a network interface 408 for communicating with remote systems, for example, via a network, and an input/output interface 410 for communicating with input and/or output devices such as a keyboard, mouse, display, and/or others.

Figure 5:
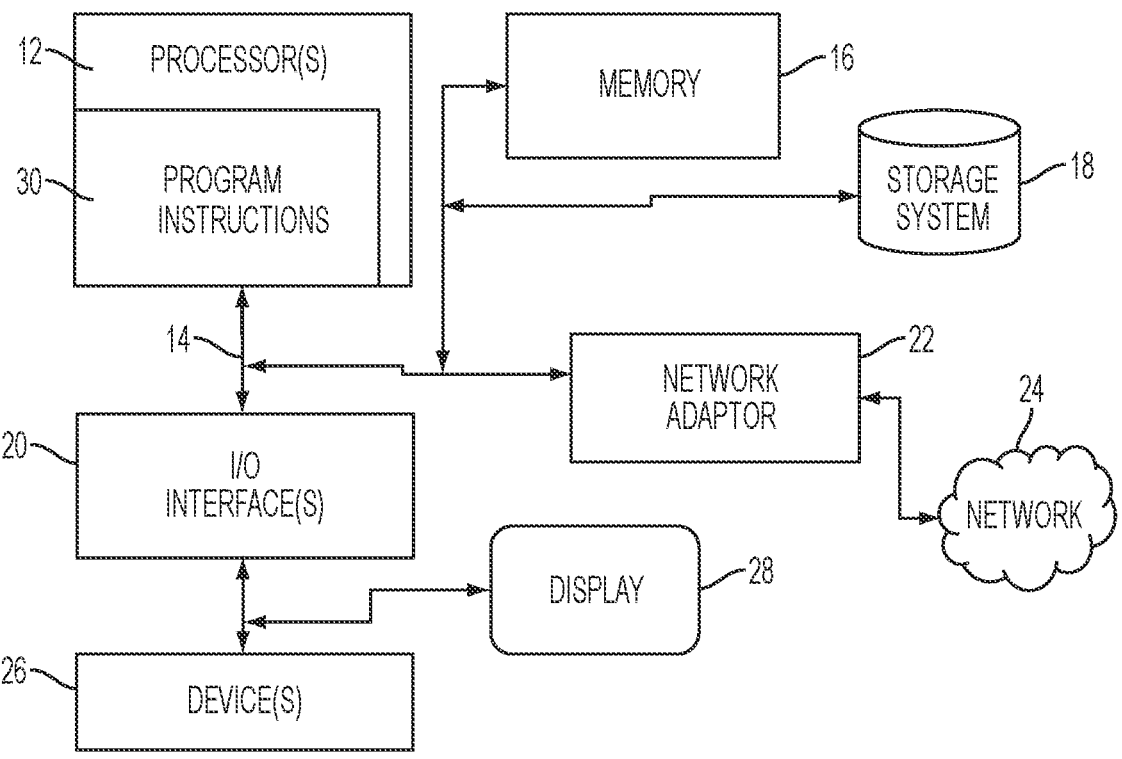
FIG. 5 illustrates a schematic of an example computer or processing system that may implement a system according to one embodiment.

FIG. 5 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
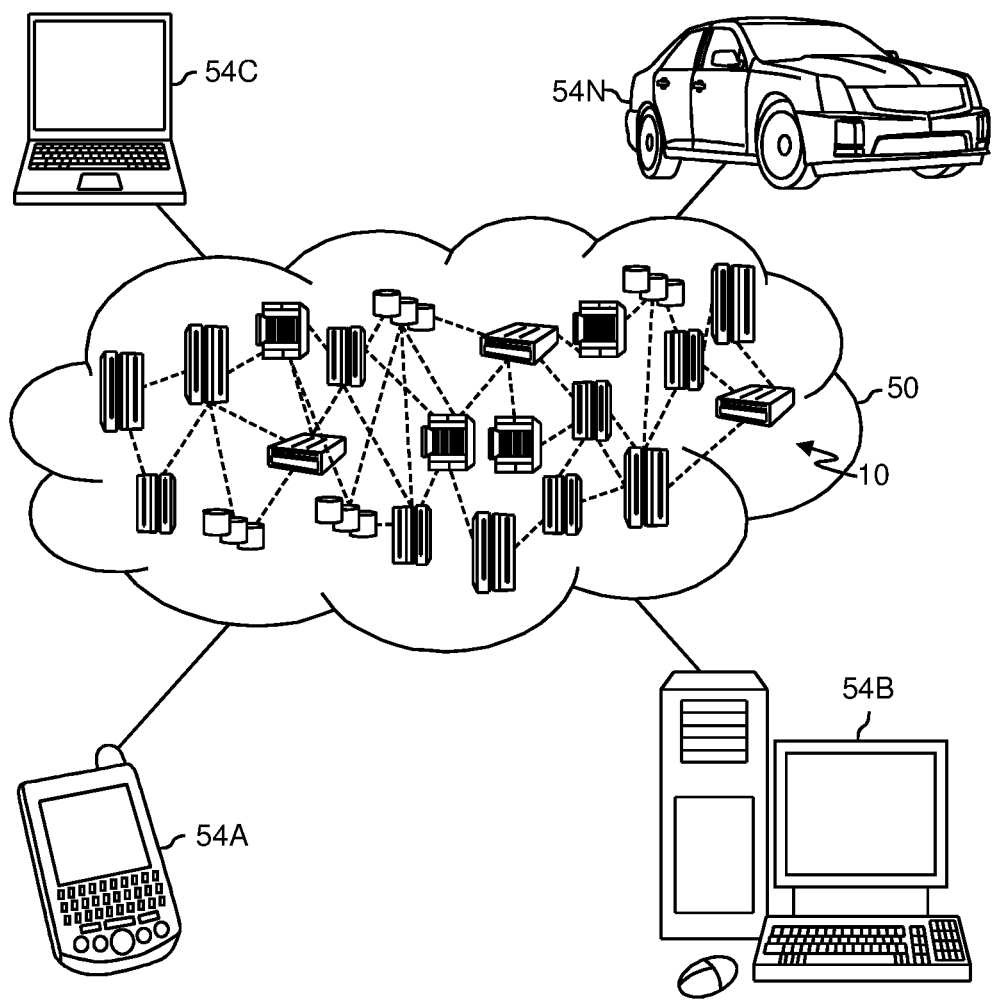
FIG. 6 illustrates a cloud computing environment in one embodiment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
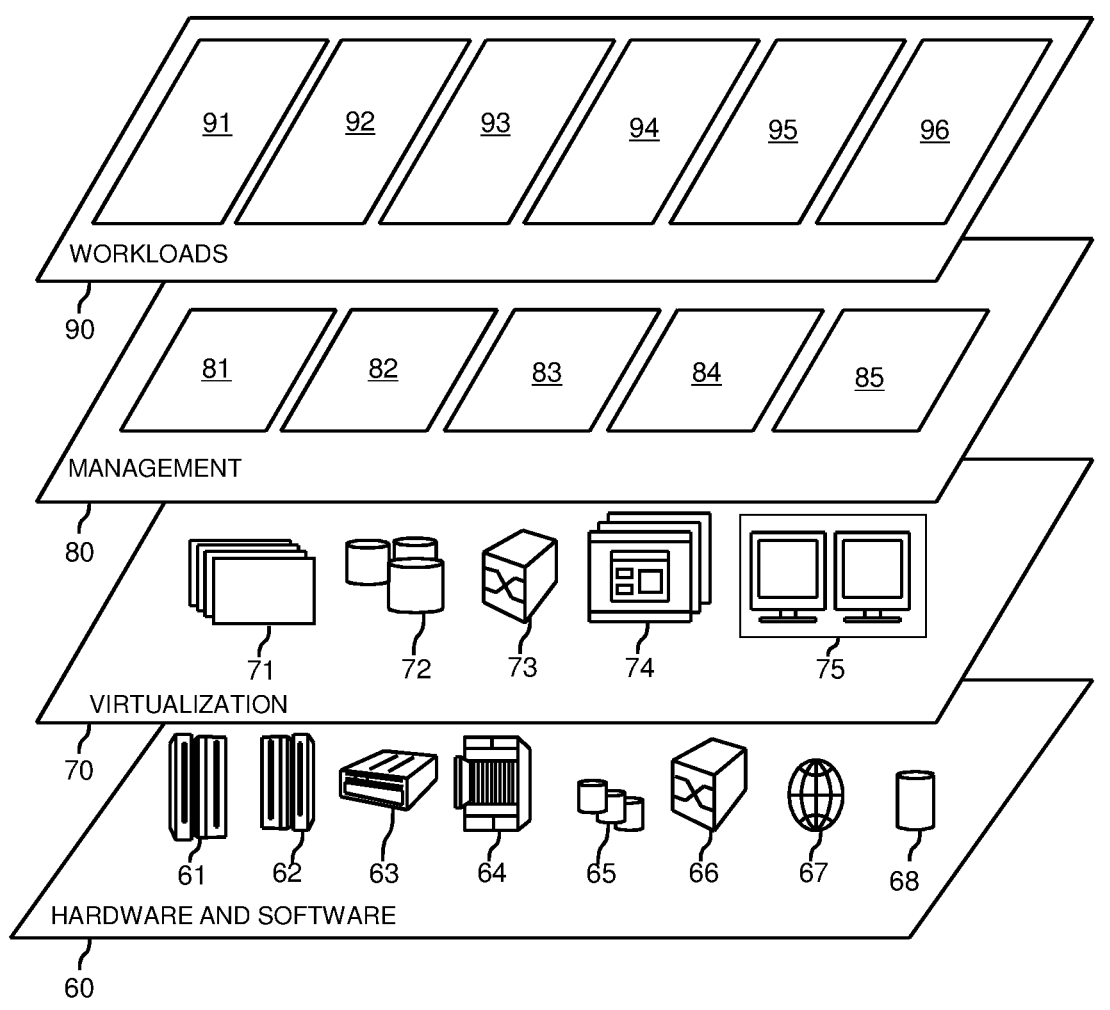
FIG. 7 illustrates a set of functional abstraction layers provided by cloud computing environment in one embodi-ment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and attention-based neural network explanation processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
a processor;
a memory device coupled with the processor;
the processor configured to at least:
    receive input data;
    pass the input data through an attention-based neural network, wherein the attention-based neural network learns attention weights associated with contextual embeddings corresponding to tokens of the input data and predicts an outcome corresponding to the input data, the attention-based neural network generating the contextual embeddings through stacks of self-attention layers, the contextual embeddings being context-aware intermediate representations of the tokens of the input data;

based on an attention weight associated with a contextual embedding corresponding to a token of the input data, determine a signed relevance score to associate with the token for quantifying the token's relevance to the outcome, the signed relevance score providing a directional relevance, the signed relevance score computed as a negative value of a gradient of a loss with respect to the attention weight associated with the contextual embedding, a negative gradient indicating that the contextual embedding contributes toward the outcome, and a positive gradient indicating that the contextual embedding contributes against the outcome; and
based on the signed relevance score determined based on the attention weight associated with the contextual embedding corresponding to the token of the input data, provide a directional explanation of the token's contribution toward or against the outcome by explaining that the token's relevance to the outcome as quantified based on the signed relevance value is toward the outcome responsive to the signed relevance score being a positive value, and explaining that the token's relevance to the outcome as quantified based on the signed relevance value is against the outcome responsive to the signed relevance score being a negative value.

2. The system of claim 1, wherein the processor is further configured to determine the signed relevance score by multiplying the gradient with the attention weight.

3. The system of claim 1, wherein the processor is further configured to allocate the signed relevance score to the token by summing a relevance of all neurons in the contextual embedding, with each single neuron relevance being computed by back-propagation of a layer-wise neuron relevance.

4. The system of claim 1, wherein the processor is further configured to provide a test for accuracy of the explanation, the test testing for resiliency property.

5. The system of claim 1, wherein the processor is further configured to provide a test for accuracy of the explanation, the test testing for consistency property.

6. The system of claim 1, wherein the processor is further configured to provide a test for accuracy of the explanation testing for resiliency property, the test selecting a subset of tokens in the input data to replace, and further based on explanation performance resulting from the test, using the subset of tokens in an adversarial attack experiment of the attention-based neural network.

7. The system of claim 1, wherein the input data includes image data and the attention-based neural network is trained to generate captions associated with the image data.

8. The system of claim 1, wherein the input data includes a sequence of text in first language, wherein the attention-based neural network is trained to generate a translation of the sequence of text in second language.

9. A method comprising:
receiving input data;
passing the input data through an attention-based neural network, wherein the attention-based neural network learns attention weights associated with contextual embeddings corresponding to tokens of the input data and predicts an outcome corresponding to the input data;
based on an attention weight associated with a contextual embedding corresponding to a token of the input data, determining a signed relevance score to associate with the token for quantifying the token's relevance to the outcome, the signed relevance score providing a directional relevance, the signed relevance score computed as a negative value of a gradient of a loss with respect to the attention weight associated with the contextual embedding, a negative gradient indicating that the contextual embedding contributes toward the outcome, and a positive gradient indicating that the contextual embedding contributes against the outcome; and based on the signed relevance score determined based on the attention weight associated with the contextual embedding corresponding to the token of the input data, providing a directional explanation of the token's contribution to the outcome by explaining that the token's relevance to the outcome as quantified based on the signed relevance value is toward the outcome responsive to the signed relevance score being a positive value, and explaining that the token's relevance to the outcome as quantified based on the signed relevance value is against the outcome responsive to the signed relevance score being a negative value.

10. The method of claim 9, further including determining the signed relevance score by multiplying the gradient with the attention weight.

11. The method of claim 9, further including allocating the signed relevance score to the token by summing a relevance of all neurons in the contextual embedding, with each single neuron relevance being computed by back-propagation of a layer-wise neuron relevance.

12. The method of claim 9, further including providing a test for accuracy of the explanation, the test testing for resiliency property.

13. The method of claim 9, further including providing a test for accuracy of the explanation, the test testing for consistency property.

14. The method of claim 9, further including providing a test for accuracy of the explanation testing for resiliency property, the test selecting a subset of tokens in the input data to replace, and further based on explanation performance resulting from the test, using the subset of tokens in an adversarial attack experiment of the attention-based neural network.

15. The method of claim 9, wherein the input data includes image data and the attention-based neural network is trained to generate captions associated with the image data.

16. The method of claim 9, wherein the input data includes a sequence of text in first language, wherein the attention-based neural network is trained to generate a translation of the sequence of text in second language.

17. A computer program product comprising a computer readable storage medium having program instructions embodied therewith, the program instructions readable by a device to cause the device to:

receive input data;

pass the input data through an attention-based neural network, wherein the attention-based neural network learns attention weights associated with contextual embeddings corresponding to tokens of the input data and predicts an outcome corresponding to the input data;

based on an attention weight associated with a contextual embedding corresponding to a token of the input data, determine a signed relevance score to associate with the token for quantifying the token's relevance to the outcome, the signed relevance score providing a directional relevance, the signed relevance score computed as a negative value of a gradient of a loss with respect to the attention weight associated with the contextual embedding, a negative gradient indicating that the contextual embedding contributes toward the outcome, and a positive gradient indicating that the contextual embedding contributes against the outcome; and based on the signed relevance score determined based on the attention weight associated with the contextual embedding corresponding to the token of the input data, provide a directional explanation of the token's contribution toward or against the outcome by explaining that the token's relevance to the outcome as quantified based on the signed relevance value is toward the outcome responsive to the signed relevance score being a positive value, and explaining that the token's relevance to the outcome as quantified based on the signed relevance value is against the outcome responsive to the signed relevance score being a negative value.

18. The computer program product of claim 17, wherein the device is further caused to determine the signed relevance score by multiplying the gradient with the attention weight.

19. The computer program product of claim 17, wherein the device is further caused to allocate the signed relevance score to the token by summing a relevance of all neurons in the contextual embedding, with each single neuron relevance being computed by back-propagation of a layer-wise neuron relevance.

\* \* \* \* \*